United States Patent
Burrow et al.

(10) Patent No.: US 8,032,795 B2
(45) Date of Patent: Oct. 4, 2011

(54) METHOD, SYSTEM AND COMPUTER PROGRAM PRODUCT FOR DIAGNOSING COMMUNICATIONS

(75) Inventors: Stephen R. Burrow, Austin, TX (US); Albert Ing, Wappingers Falls, NY (US); Gregory F. Pfister, Austin, TX (US); Patrick J. Sugrue, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 12/029,577

(22) Filed: Feb. 12, 2008

(65) Prior Publication Data
US 2009/0204875 A1    Aug. 13, 2009

(51) Int. Cl.
G06F 11/00 (2006.01)
(52) U.S. Cl. ........................................... 714/43
(58) Field of Classification Search ............... 714/43
See application file for complete search history.

(56) References Cited

U.S. PATENT DOCUMENTS

| | | | |
|---|---|---|---|
| 6,247,149 B1 | 6/2001 | Falls et al. | |
| 6,792,564 B2 | 9/2004 | Ahrens, Jr. et al. | |
| 6,915,440 B2 | 7/2005 | Berglund et al. | |
| 7,111,050 B2 | 9/2006 | McAdams | |
| 7,675,867 B1 * | 3/2010 | Mraz et al. | 370/254 |
| 2003/0023737 A1 | 1/2003 | Johnson et al. | |
| 2005/0086336 A1 | 4/2005 | Haber | |
| 2006/0010352 A1 | 1/2006 | Mukherjee et al. | |
| 2006/0031521 A1 * | 2/2006 | Wilk | 709/227 |
| 2006/0230306 A1 | 10/2006 | Richards et al. | |
| 2007/0088974 A1 | 4/2007 | Chandwani et al. | |
| 2007/0143842 A1 | 6/2007 | Turner et al. | |

* cited by examiner

*Primary Examiner* — Scott T Baderman
*Assistant Examiner* — Jigar Patel
(74) *Attorney, Agent, or Firm* — Cantor Colburn LLP; Steven Chiu

(57) ABSTRACT

A method for diagnosing communications includes sending a message from a sending node to a receiving node. The sending node detects an error in the receiving node receiving the message. A force log request is sent from the sending node to the receiving node, the force log request including a request for the receiving node to log information. A force log response is received from the receiving node at the sending node, the force log response including the logged information. The sending node diagnoses the communications error in response to the force log response.

21 Claims, 5 Drawing Sheets

| Mad Field Name | Description |
| --- | --- |
| mad_type | Force Log MAD |
| mad_modifier | Type of Log to be written; tells B what to do. |
| Log_type | Specific logging routine to be called on B side; optional |
| Parm 1 | Specific Parms needed by the Logging Call specified in mad_modifier and Log_type |
| Parm 2 | " |
| Parm 3 | " |
| Parm 4 | |
| Local Reason Code | Why A is sending this MAD (its own coding); indicates the error or abnormality A detected. |
| Local Log Count | Serves as an identifier of this request, from A's point of view |
| Local Adapter ID | Identifier of the adapter on A's side where the error was manifest |
| spare[16] | User Defined space |

FIGURE 5

METHOD, SYSTEM AND COMPUTER PROGRAM PRODUCT FOR DIAGNOSING COMMUNICATIONS

BACKGROUND OF THE INVENTION

This invention relates generally to inter-computer communications, and more particularly to providing a method, system and computer program product for diagnosing communications between computer systems.

Diagnosing errors in inter-computer communication links is often difficult because the site where an error is detected is often not where the error is actually occurring. For example, one side of a communication link may send a message to another and expect a reply, but never receive one. The error is likely to be on the other side, but the sending side detects the error.

The situation is often complicated by several factors. One such factor is the difficulty in correlating log information on both sides of the communication link because separate logs are based on time clocks that are not synchronized. Another factor is that the different sides can be physically distant from one another, from across a room from one another to kilometers apart. In the latter case in particular, the time delay in communication substantially increases the difficulty of correlating error indications on the two sides of the communication link. A root issue, however, is that error detection is on one side of a communication link while the error cause is on the other.

In addition, cases are regularly encountered which are not adequately anticipated and covered by the responses and diagnostics preprogrammed or built into the communications system. Exemplary situations that typically cause problems include a silent (e.g., unlogged) drop of a message by the recipient node for reasons unknown, a message received with header information that is incorrect or unanticipated, and a message exchange sequence that exhibits unanticipated delays or hangs. Often such under-anticipated events will elicit standard responses, such as logging of status or error information, but, in practice, this has turned out to not always be enough.

While many existing systems do not address this problem at all, some attempt to solve this problem by deliberately injecting an error into the communications link. This forces the receiving node to produce an error log entry, giving some information about what is going on at the receiving node. However, this has two disadvantages. First, doing this brings down the communication link; this will at best cause unnecessary recovery actions, and at worst, particularly if the link has no redundant alternative, can cause the system to go down. Second, the type of information gathered on the receiving node will be appropriate to the error that was induced, but may not be appropriate for the kind of error originally detected.

It would be desirable to be able to improve the diagnosis of communication errors between nodes.

BRIEF SUMMARY OF THE INVENTION

An exemplary embodiment includes a method for diagnosing communications including sending a message from a sending node to a receiving node. The sending node detects an error in the receiving node receiving the message. A force log request is sent from the sending node to the receiving node, the force log request including a request for the receiving node to log information. A force log response is received from the receiving node at the sending node, the force log response including the logged information. The sending node diagnoses the communications error in response to the force log response.

Another exemplary embodiment includes a system for diagnosing communications, the system including a sending node in communication with a receiving node over a communication link. The sending node sends a message to a receiving node. The sending node detects an error in the receiving node receiving the message. The sending node sends a force log request to the receiving node, the force log request including a request for the receiving node to log information. The sending node receives a force log response from the receiving node, the force log response including the logged information. The sending node diagnoses the communications error in response to the force log response.

A further exemplary embodiment includes a computer program product for diagnosing communications, the computer program product comprising: a computer-readable storage medium for storing instructions for diagnosing communications, the diagnosing communications comprising a method of sending a message from a sending node to a receiving node. The sending node detects an error in the receiving node receiving the message. A force log request is sent from the sending node to the receiving node, the force log request including a request for the receiving node to log information. A force log response is received from the receiving node at the sending node, the force log response including the logged information. The sending node diagnoses the communications error in response to the force log response.

BRIEF DESCRIPTION OF THE DRAWINGS

Referring now to the drawings wherein like elements are numbered alike in the several FIGURES:

FIG. 5 illustrates a fields used in a force log message in exemplary embodiments.

DETAILED DESCRIPTION OF EXEMPLARY EMBODIMENTS

An exemplary embodiment of the present invention provides a diagnostic message that one computer system can send to the other requesting that diagnostic information be logged. The message includes information specifying the type of information to be logged and/or the type of error encountered and information identifying the error as seen on the sending node, containing sufficient data to correlate the log entry on the receiving node with corresponding data at the sending node.

Figure 1:
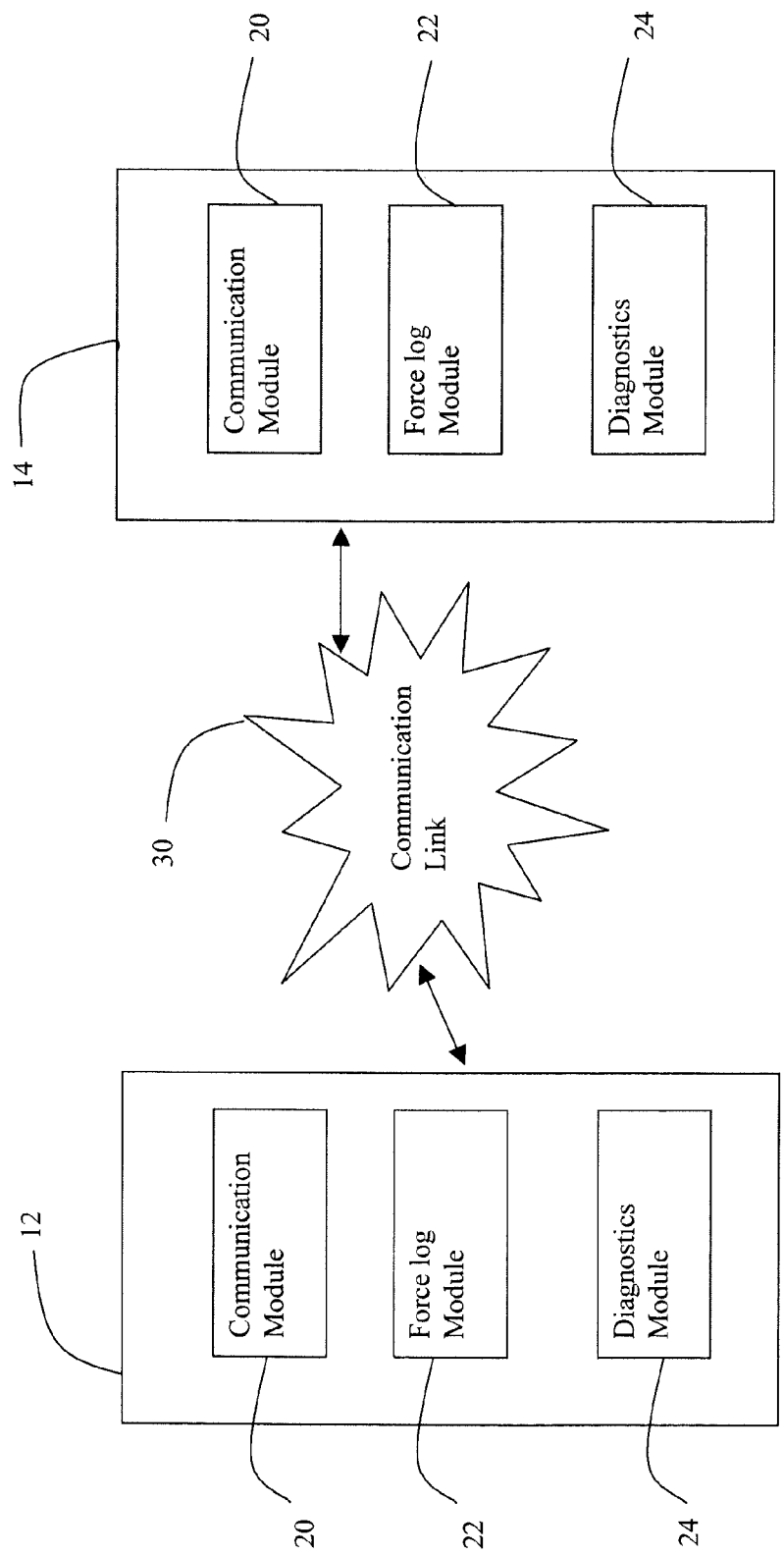
FIG. 1 is a block diagram of a system for diagnosing communications in an exemplary embodiment.

FIG. 1 is a block diagram of a system for diagnosing communications in an exemplary embodiment. A first node 12 is in communication with a second node 14 over a communication link 30. It is understood that both node 12 and node 14 can send and receive communications and implement the processes described herein. Node 12 is referred to as the sending node and node 14 is referred to as the receiving node for ease of describing processes occurring when node 12 sends a message to node 14.

First node 12 and second node 14 may be implemented using a variety of processor-enabled devices such as computers, servers, PDAs, etc. In exemplary embodiments, the first node 12 and second node 14 implement processes in response to instructions stored on a computer-readable storage medium. Both first node 12 and second node 14 include a communication module 20 that handles the sending and receiving of messages over communication link 30. The communication modules 20 may be implemented in software and/or hardware. In an exemplary embodiment, communications modules 20 support an INFINIBAND architecture with link 30 being an INFINIBAND link. It is understood that other communication protocols may be used, and embodiments are not limited to INFINIBAND applications.

The force log modules 22 may be implemented in software and/or hardware. The force log module 22 in the sending node 12 generates force log request described in further detail herein. The force log request instructs the receiving node 14 on types of data that should be logged in order to diagnose communication errors. In response, the receiving node 14 creates the error log and then sends a force log response back to the sending node 12 including the information requested in the force log request.

The diagnostic modules 24 may be implemented in software and/or hardware. The diagnostic module 24 in the sending node 12 uses locally generated message information (e.g., type of message, time of message, etc.) along with information in the force log response to diagnose a communication error.

In the event that a communication error arises, data can still be transmitted from the sending node 12 to the receiving node 14. In exemplary embodiments, communications link 30 is physically duplexed. Communication link 30 includes two, separate bundled physical links, one used for transmission in one direction, and the other used for reception in the other direction. It is often observed that there are errors only in one direction. Further, the error is often less than total communications failure, but rather is intermittent and, hence, very difficult to diagnose. For these reasons, despite the error, data can still be transmitted. In this situation, sending node 12 detecting the error can still send data to receiving node 14, and vice versa.

Figure 2:
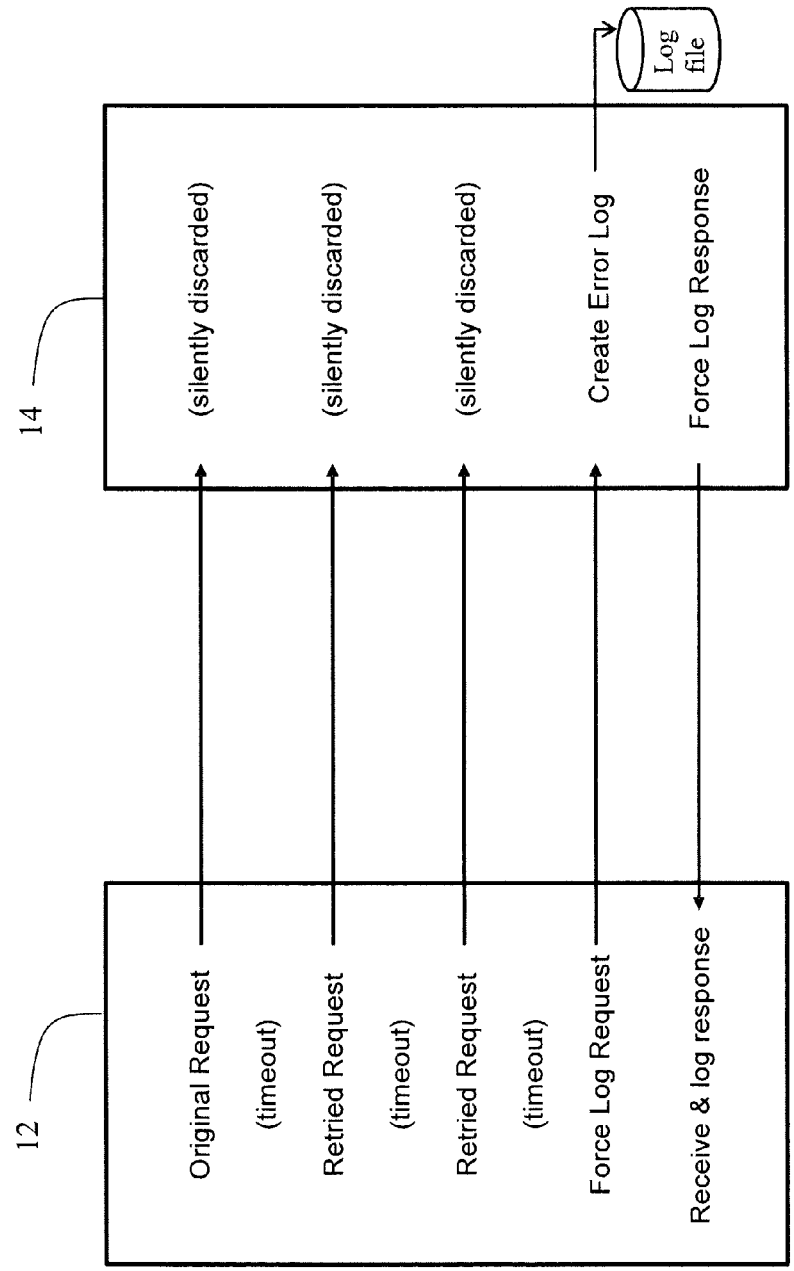
FIG. 2 illustrates signal flow between two nodes in an exemplary embodiment.
Figure 3:
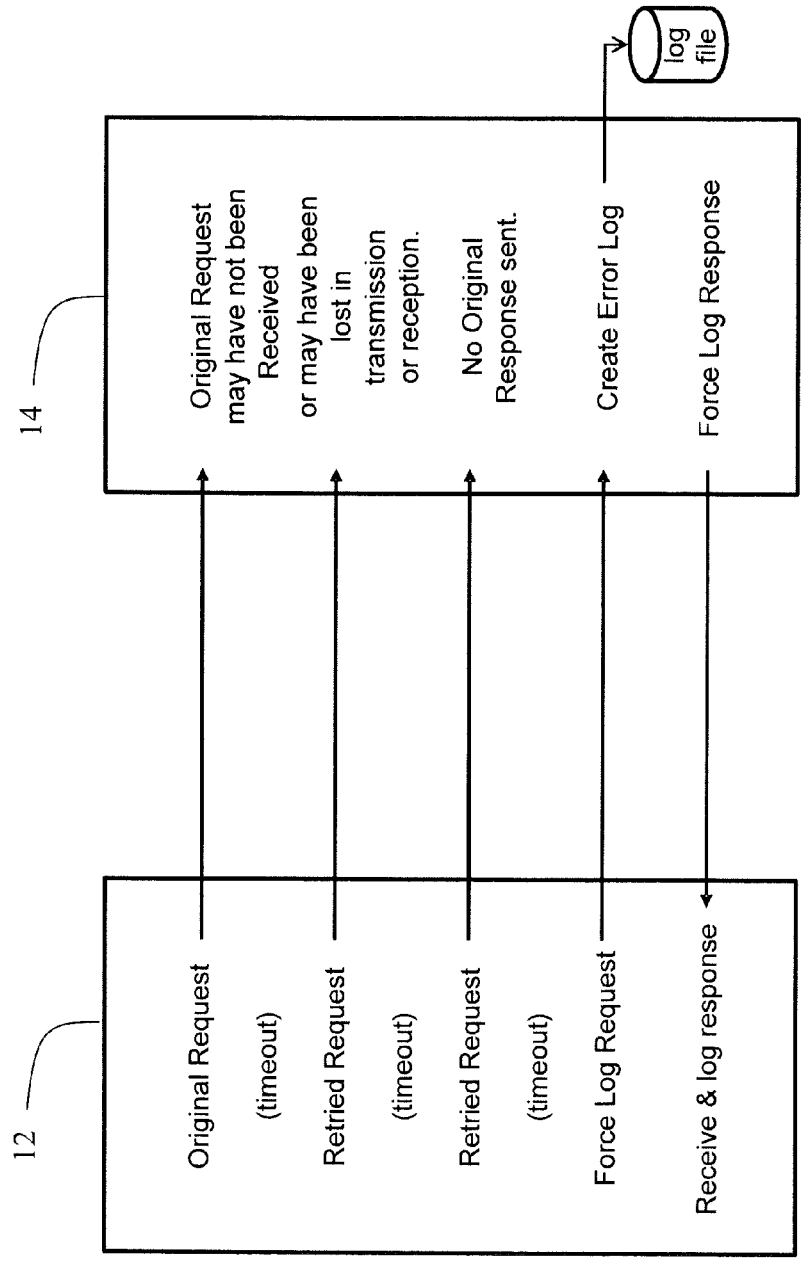
FIG. 3 illustrates signal flow between two nodes in an exemplary embodiment.
Figure 4:
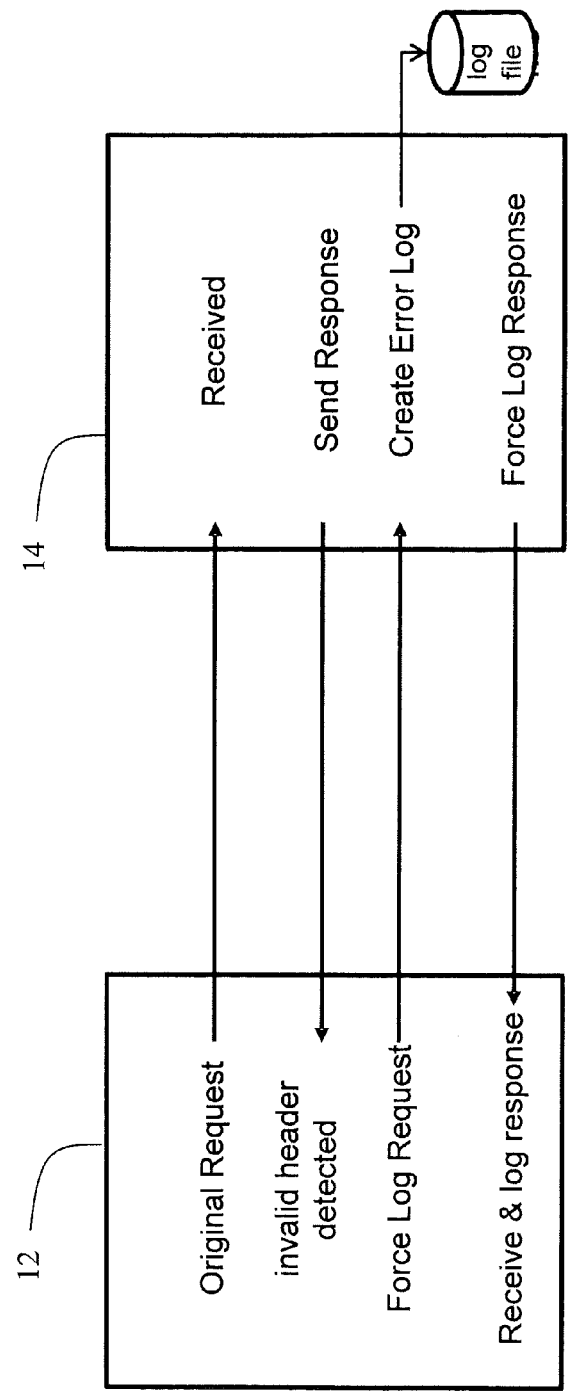
FIG. 4 illustrates signal flow between two nodes in an exemplary embodiment.

FIGS. 2-4 illustrate examples of messaging between sending node 12 and receiving node 14. As described further below, upon detecting an error sending node 12 sends a force log request to receiving node 14. The force log request contains information identifying the type of diagnostic information appropriate to the error, along with information identifying both the message and the error's characteristics as seen by sending node 12. On receipt of the force log request, receiving node 14 logs specified diagnostic data along with identifying information from sending node 12. The log may be in the form of writing an error log entry, hardened on static storage or not. The force log response from receiving node 14 to sending node 12 includes the information requested.

Sending node 12 may send a force log message automatically, as part of its response to detecting the error. Alternatively, sending node 12 may send the force log message at the command of a system administrator. The latter is particularly useful in situations where what is going wrong is completely unclear, particularly if the message specifies that receiving node 14 log to storage a typical circular buffer of log messages, saving it from being overwritten.

Given the identifying information from sending node 12, diagnostic module 24 executes diagnostic procedures to correlate the data captured on receiving node 14 in the force log response with information from sending node 12 about how the error is manifest, greatly simplifying the task of uncovering the root cause of the error.

FIG. 2 illustrates signal flow between two nodes in an exemplary scenario where the receiving node 14 silently discards a message from the sending node 12. As shown in FIG. 2 the receiving node 14 silently discards (e.g., no error message is generated) the originating message from sending node 12. The sending node 12 retries the message twice, with the same result. Sending node 12 then transmits a force log request to the receiving node 14. In response, receiving node 14 creates an error log and stores the error log in a log file. The receiving node 14 then sends a force log response to the sending node 12 including the error log so that the sending node can diagnose the message failure in consideration of information logged at the receiving node 14.

FIG. 3 illustrates signal flow between two nodes in an exemplary scenario where the receiving node 14 does not receive a message. As shown in FIG. 3 the receiving node 14 does not acknowledge an originating message from sending node 12. The sending node 12 retries the message twice, with the same result. Sending node 12 then transmits a force log request to the receiving node 14. In response, receiving node 14 creates an error log and stores the error log in a log file. The receiving node 14 then sends a force log response including the error log to the sending node 12 so that the sending node can diagnose the message failure in consideration of information logged at the receiving node 14.

FIG. 4 illustrates signal flow between two nodes in an exemplary scenario where the receiving node 14 responds to a message with an incorrect header. As shown in FIG. 4 the receiving node 14 replies to an originating message from sending node 12. The reply message from receiving node 14 includes an incorrect header. Sending node 12 then transmits a force log request to the receiving node 14. In response, receiving node 14 creates an error log and stores the error log in a log file. The receiving node then sends a force log response including the error log to the sending node 12 so that the sending node can diagnose the message failure in consideration of information logged at the receiving node 14.

FIG. 5 illustrates the force log request in exemplary embodiments. The force log request is in the form of a management datagram having a number of fields. The first field, mad_type, identifies the management datagram as a force log request. The second field, mad_modifier, instructs the receiving node 14 as to the type of log to be written. An exemplary mad_modfier type is a force log IB trace instruction causing 64K of circular trace data to be logged and written to disk at the receiving node 14. This instruction captures the trace data to avoid having the circular buffer overwritten. Another exemplary mad_modfier type is a force log instruction. This causes the receiving node 14 to generate a log to be logged and written to disk as determined by the log_type field. This may involve receiving node 14 logging the contents of registers and system control blocks, such as QP control blocks, system error control blocks, etc.

The third field, log_type, specifies a logging routine to be called at the receiving node 14. Fields 4-7 (Parm) are used to identify parameters needed by the logging call specified by the mad_modifier and log_type fields. The first seven fields hold information that the sending node 12 uses to tell the receiving node 14 what to do. The remaining fields include local information from the sending node 12 to identify the message in the error log. The local reason code field indicates what error was experienced at the sending node 12. The local log count field serves as an identifier for this force log request, as established by the sending node 12. The local adapter ID field identifies the adapter on the sending node 12 where the error was manifest. The final field is a user-defined field.

Technical effects and benefits of embodiments include the ability to diagnose message failures by forcing a receiving node to log information as specified by the sending node. This information is then returned to the sending node to facilitate diagnosis of the message error using data from both the sending node and the receiving node.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for diagnosing communications, the method comprising:
sending a message from a sending node to a receiving node;
detecting at the sending node an error in the receiving node receiving the message;
sending a force log request from the sending node to the receiving node, the force log request including a request for the receiving node to log information, the force log request is a management datagram having a number of fields, a first field identifying the management datagram as the force log request and a second field identifying the type of log to be written by the receiving node;
receiving a force log response from the receiving node at the sending node, the force log response including the logged information as defined by the fields in the force log request;
diagnosing the communications error in response to the force log response.

2. The method of claim 1 wherein:
the second field identifies a circular trace of data.

3. The method of claim 1 wherein:
the second field identifies contents of registers and system control blocks.

4. The method of claim 1 wherein:
the force log request includes a third field identifying a logging routine to be called at the receiving node.

5. The method of claim 1 wherein:
the force log request includes a field identifying an error experienced at the sending node.

6. The method of claim 1 wherein:
the force log request includes a field identifying the force log request, as established by the sending node.

7. The method of claim 1 wherein:
the force log request includes a field identifying the adapter on the sending node where the error was manifest.

8. A system for diagnosing communications, the system comprising:
a sending node in communication with a receiving node over a communication link;
the sending node sending a message to a receiving node;
the sending node detecting an error in the receiving node receiving the message;
the sending node sending a force log request to the receiving node, the force log request including a request for the receiving node to log information, the force log request is a management datagram having a number of fields, a first field identifying the management datagram as the force log request and a second field identifying the type of log to be written by the receiving node;
the sending node receiving a force log response from the receiving node, the force log response including the logged information as defined by the fields in the force log request;
the sending node diagnosing the communications error in response to the force log response.

9. The system of claim 8 wherein:
the second field identifies a circular trace of data.

10. The system of claim 8 wherein:
the second field identifies contents of registers and system control blocks.

11. The system of claim 8 wherein:
the force log request includes a third field identifying a logging routine to be called at the receiving node.

12. The system of claim 8 wherein:
the force log request includes a field identifying an error experienced at the sending node.

13. The system of claim 8 wherein:
the force log request includes a field identifying the force log request, as established by the sending node.

14. The system of claim 8 wherein:
the force log request includes a field identifying the adapter on the sending node where the error was manifest.

15. A computer program product for diagnosing communications, the computer program product comprising:
a computer-readable storage medium for storing instructions for diagnosing communications, the diagnosing communications comprising a method of:
sending a message from a sending node to a receiving node;
detecting at the sending node an error in the receiving node receiving the message;
sending a force log request from the sending node to the receiving node, the force log request including a request for the receiving node to log information, the force log request is a management datagram having a number of fields, a first field identifying the management datagram as the force log request and a second field identifying the type of log to be written by the receiving node;

receiving a force log response from the receiving node at the sending node, the force log response including the logged information as defined by the fields in the force log request;

diagnosing the communications error in response to the force log response.

16. The computer program product of claim 15 wherein:
the second field identifies a circular trace of data.

17. The computer program product of claim 15 wherein:
the second field identifies contents of registers and system control blocks.

18. The computer program product of claim 15 wherein:
the force log request includes a third field identifying a logging routine to be called at the receiving node.

19. The computer program product of claim 15 wherein:
the force log request includes a field identifying an error experienced at the sending node.

20. The computer program product of claim 15 wherein:
the force log request includes a field identifying the force log request, as established by the sending node.

21. The computer program product of claim 15 wherein:
the force log request includes a field identifying the adapter on the sending node where the error was manifest.

* * * * *